(12) United States Patent
Pfister

(10) Patent No.: US 7,343,786 B2
(45) Date of Patent: Mar. 18, 2008

(54) DIAGNOSTIC METHOD FOR CATALYTIC CONVERTERS

(75) Inventor: Tobias Pfister, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 11/378,796

(22) Filed: Mar. 16, 2006

(65) Prior Publication Data

US 2006/0225492 A1    Oct. 12, 2006

(30) Foreign Application Priority Data

Apr. 7, 2005 (DE) .................. 10 2005 015 998

(51) Int. Cl.
*G01M 15/00* (2006.01)

(52) U.S. Cl. .................................................. 73/118.1

(58) Field of Classification Search ............. 73/23.31, 73/23.32, 116, 117.2, 117.3, 118.1, 119 R
See application file for complete search history.

(56) References Cited

U.S. PATENT DOCUMENTS

| | | | | |
|---|---|---|---|---|
| 5,428,956 A | * | 7/1995 | Maus et al. ............... | 60/277 |
| 5,590,521 A | * | 1/1997 | Schnaibel et al. ......... | 60/274 |
| 5,938,715 A | * | 8/1999 | Zhang et al. .............. | 701/109 |
| 6,142,012 A | * | 11/2000 | Schneider et al. ........ | 73/118.1 |
| 6,145,302 A | * | 11/2000 | Zhang et al. .............. | 60/274 |
| 6,463,732 B2 | * | 10/2002 | Baeuerle et al. .......... | 60/274 |
| 6,523,340 B1 | * | 2/2003 | Kurihara et al. ........... | 60/274 |
| 6,601,382 B2 | * | 8/2003 | Nader et al. ............... | 60/274 |
| 7,021,129 B2 | * | 4/2006 | Busch et al. .............. | 73/118.1 |
| 7,146,798 B2 | * | 12/2006 | Schneider et al. ........ | 60/277 |
| 2002/0000087 A1 | * | 1/2002 | Baeuerle et al. .......... | 60/274 |

FOREIGN PATENT DOCUMENTS

DE          44 26 020          1/1996

* cited by examiner

*Primary Examiner*—Eric S. McCall
(74) *Attorney, Agent, or Firm*—Kenyon & Kenyon LLP

(57) ABSTRACT

A diagnostic method for catalytic converters includes the steps: repeated measurement of an actual temperature downstream from a catalytic converter volume, repeated calculation of a first model temperature on the basis of a first temperature model, and evaluation of a conversion capability of the catalytic converter volume on the basis of a first difference which is a function of the actual temperature and the first model temperature. The method is characterized in that a second model temperature is additionally calculated on the basis of a second temperature model, a second difference is formed which is a function of the second model temperature and the first model temperature, and the conversion capability is evaluated on the basis of a value which is a function of the first difference, this value being normalized to a value which is a function of the second difference.

10 Claims, 2 Drawing Sheets

DIAGNOSTIC METHOD FOR CATALYTIC CONVERTERS

FIELD OF THE INVENTION

The present invention relates to a diagnostic method for catalytic converters including the steps: repeated measurement of an actual temperature downstream from a catalytic converter volume, repeated calculation of a first model temperature on the basis of a first temperature model, and evaluation of a conversion capability of the catalytic converter volume on the basis of a first difference which is a function of the actual temperature and the first model temperature.

Furthermore, the present invention relates to a computer program, which is programmed for applying this method, a memory medium of a controlling and/or regulating system of an internal combustion engine, on which a computer program for applying the method is stored, and a controlling and/or regulating system of an internal combustion engine, which is programmed for application of the method.

BACKGROUND INFORMATION

A method, a computer program, a memory medium, and a controlling and/or regulating system are described in German Patent Application No. DE 44 26 020.

During operation of internal combustion engines, monitoring of all exhaust gas treatment components for OBD limiting values, which are mostly specified as a multiple of an emission limiting value, is required by law within the scope of an on board diagnosis (OBD). Coated catalytic exhaust gas treatment components such as oxidation catalytic converters, NOx accumulator-type catalytic converters, or coated particulate filters must be checked for their operability. Most of the known approaches use temperatures, which are determined for points upstream and downstream from a catalytic converter, in order to evaluate a measure for the completeness of an exothermal reaction in the catalytic converter. This measure is used as the measure for the operability of the catalytic coating or the catalytic converter.

In order to achieve reliable diagnostic results, German Patent Application No. DE 44 26 020 provides a diagnosis in a predetermined operating state of the internal combustion engine, in particular an operating state having a low exhaust gas mass flow rate. The model temperature, used in addition to the measured temperature, may be formed either on the basis of a fully non-operational catalytic converter, a fully operational catalytic converter, or what is known as a borderline catalytic converter, the borderline catalytic converter having an operability which is between these extremes (fully non-operational, fully operational). By definition, the borderline catalytic converter has an operability which just about meets or just about no longer meets the statutory requirements for its conversion capability. In any event, German Patent Application No. DE 44 26 020 provides only one single difference of values of one measured temperature and values of one single model temperature.

SUMMARY OF THE INVENTION

In contrast, the present invention improves the above-mentioned method in that a second model temperature is additionally calculated on the basis of a second temperature model, a second difference is formed as a function of the second model temperature and the first model temperature, and the conversion capability is evaluated on the basis of a value dependent on the first difference, which is normalized to a value dependent on the second difference.

By additionally taking a second model temperature into account, which is preferably based on a different hypothesis about the operability of the catalytic converter than what is used in the formation of the first model temperature, and due to the feature of normalization, it is possible to achieve reliable diagnostic results in a greater operating range, in particular even in the event of higher exhaust gas mass flow rates. The second model temperature is used as a reference temperature and thus as a measure for a reference heat quantity which, in a model catalytic converter having a defined operability, is released in a certain operating state by exothermal reactions.

If the diagnosis is executed together with the controlled generation of an exothermally reactive exhaust gas atmosphere of the type which may be generated by an injection or generally by retarded secondary injections into combustion chambers of the internal combustion engine, already small temperature amplitudes and thus small injection quantities are sufficient for achieving reliable diagnostic results. Therefore, the diagnosis may possibly also be carried out purely passively, i.e., by utilizing the reducing exhaust gas atmospheres which occur during normal operation, which is favorable for the total emissions and the fuel consumption. Reducing exhaust gas atmospheres may occur, for example, during acceleration and/or during regeneration of a diesel particulate filter situated downstream from the catalytic converter.

DETAILED DESCRIPTION

Figure 1:
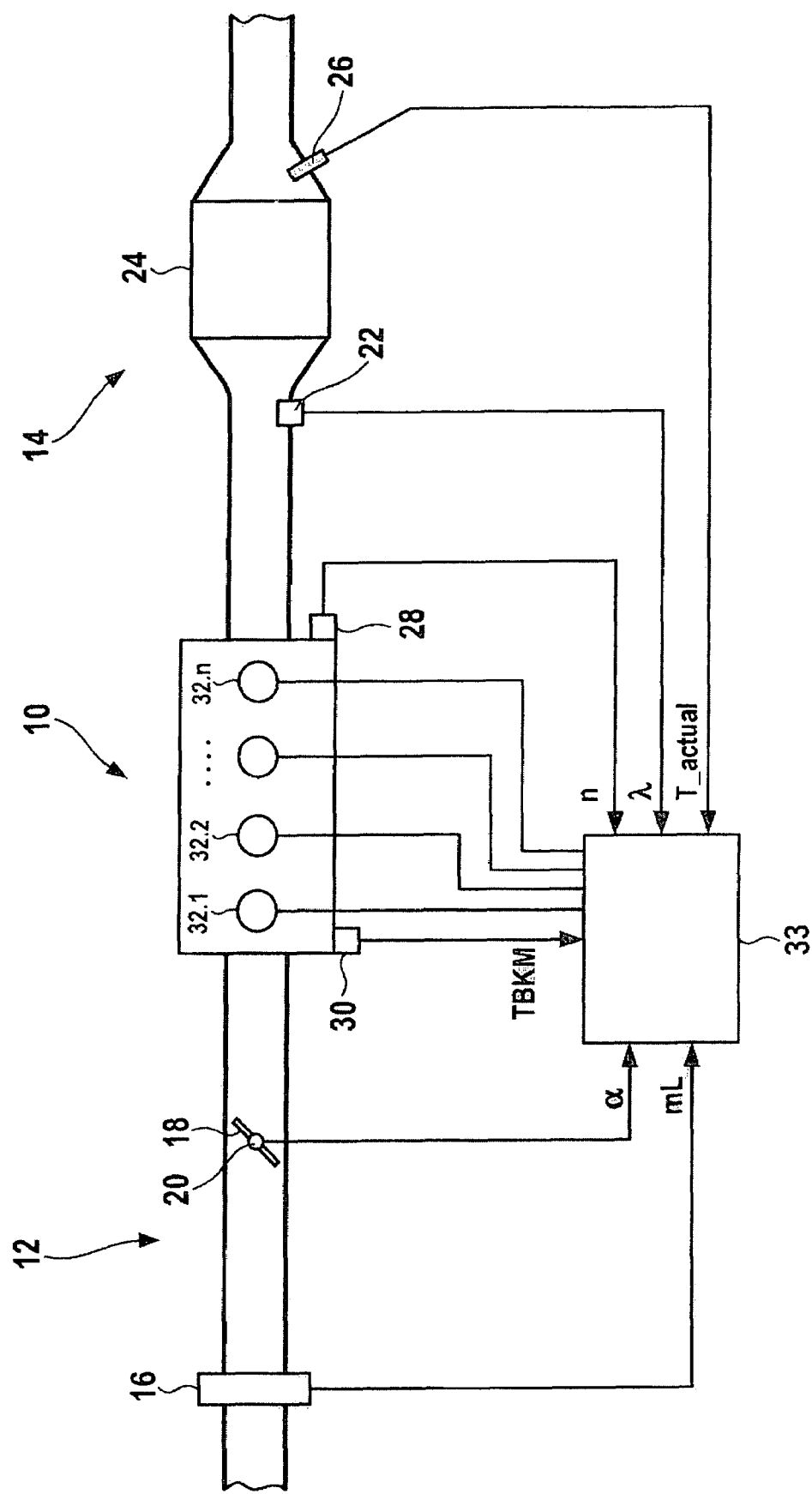
FIG. 1 schematically shows the technical surroundings of the present invention.

FIG. 1 shows an internal combustion engine 10 which is supplied with air via an intake manifold 12 and whose exhaust gases are discharged into an exhaust system 14. Viewed in the flow direction of the drawn-in air, an air flow sensor or air mass flowmeter 16, e.g., a hot-film air mass flowmeter, and a throttle valve 18, optionally having a sensor 20 for detecting the opening angle of throttle valve 18, are situated in intake manifold 12. Viewed in the flow direction of the exhaust gas, an exhaust gas probe 22 and a catalytic converter 24 are situated in exhaust system 14. A temperature sensor 26 is attached to the outlet of catalytic converter 24. Catalytic converter 24 is a three-way catalytic converter or an oxidation catalytic converter which is situated upstream from a diesel particulate filter (not shown).

A rotational speed sensor 28 and a temperature sensor 30 are attached to internal combustion engine 10. Furthermore, internal combustion engine 10 has fuel injectors 32.1, 32.2, . . . , 32.n for metering fuel into the combustion chambers of internal combustion engine 10. Output signals mL of air flow sensor or air mass flowmeter 16, alpha of sensor 20 for detecting the opening angle of throttle valve 18, lambda of exhaust gas probe 22, T_actual of temperature sensor 26, n of rotational speed sensor 28, and TBKM of temperature sensor 30 are supplied to a central control unit 33 via appropriate connecting lines. Control unit 33 analyzes the sensor signals and, via additional connecting lines, controls fuel injectors 32.1, . . . , 32.n and optionally ignition devices (not shown).

Moreover, the method according to the present invention for monitoring the operability of catalytic converter 24 is carried out by control unit 33. For this purpose, the control unit executes a computer program, among other things, which is programmed for use in one of the methods presented in the following. For the aforementioned purpose, control unit 33 has a memory medium containing the computer program, so that control unit 33 represents an exemplary embodiment of a controlling and/or regulating system of internal combustion engine 10 according to the present invention which is programmed for use in one of the methods cited in the following.

Figure 2:
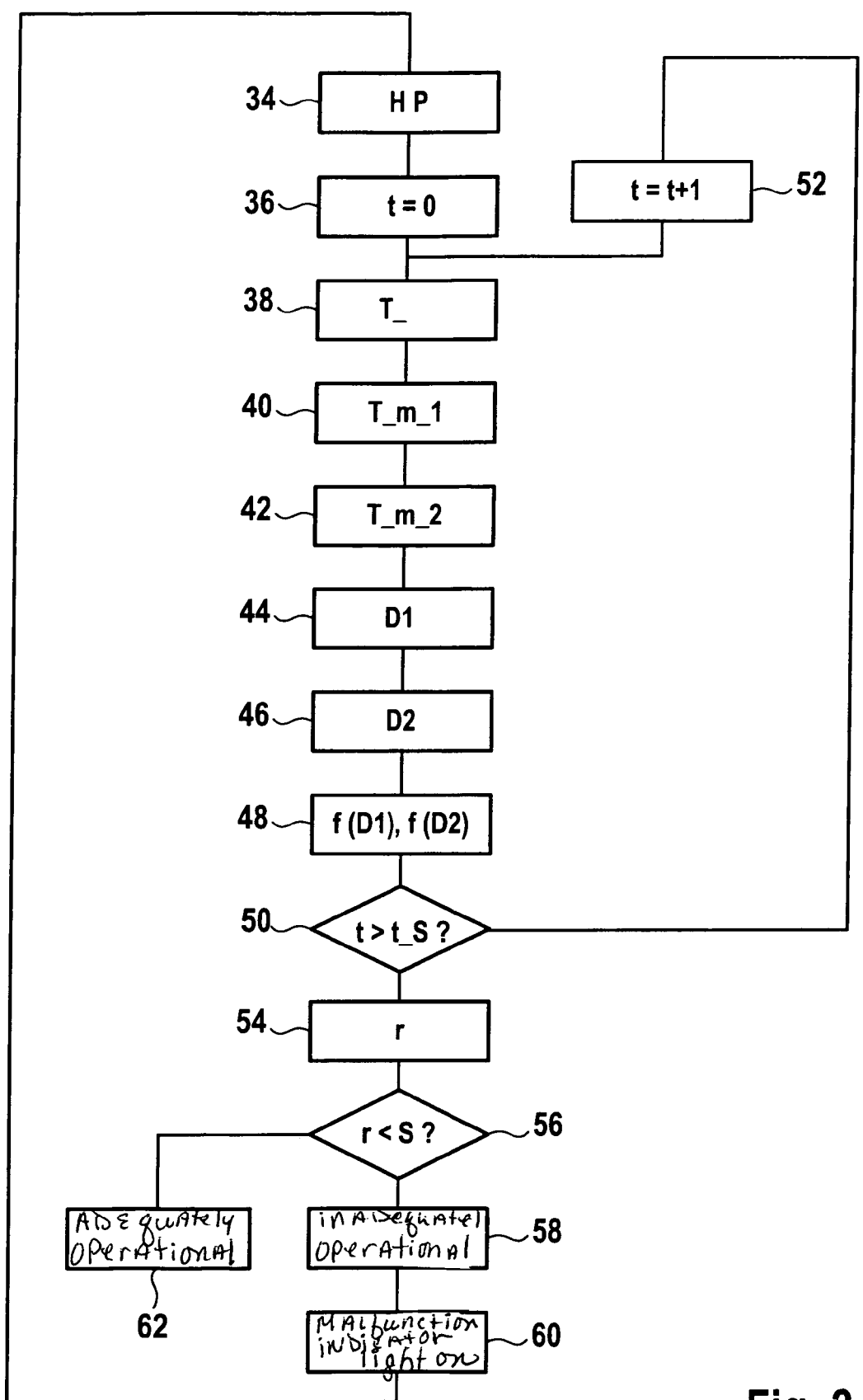
FIG. 2 schematically shows a flow chart as an exemplary embodiment of a method according to the present invention.

FIG. 2 shows a flow chart as an exemplary embodiment of a method according to the present invention. Step 34 corresponds to a main program for controlling internal combustion engine 10 which is executed by control unit 33. As soon as predetermined conditions for the execution of a diagnosis of catalytic converter 24 are present, the main program branches from step 34 to step 36 in which a time variable or counting variable t is set to zero. Actual temperature T_actual is subsequently detected by analyzing the signal of temperature sensor 26. This is followed by step 40 in which a first model temperature T_m_1 is determined on the basis of a first temperature model.

The predetermined conditions under which a catalytic converter diagnosis is executed may include, for example, that internal combustion engine 10 is at operating temperature and that a predetermined period of time has elapsed since the last execution of the catalytic converter diagnosis or a predetermined number of driving cycles have been carried out. Another important condition is the fact that an exothermally reactive exhaust gas atmosphere prevails or is generated in catalytic converter 24. This may occur actively as well as passively. Passive generation of an exothermally reactive exhaust gas atmosphere is understood in this connection to be the utilization of operating states for the diagnosis in which oxygen as well as unburned fuel are present in the exhaust gas. This is the case when a diesel particulate filter is regenerated, for example. In contrast, controlled generation of such an exhaust gas atmosphere is understood as active generation. A sufficient proportion of oxygen in the exhaust gas may be generated, for example, by combusting a fuel quantity, injected into the combustion chambers of internal combustion engine 10, with excess air (lambda>1). Retarded injection of fuel, which at least no longer completely participates in the combustion in the combustion chambers of internal combustion engine 10, in connection with excess air and excess oxygen results in a reactive exhaust gas atmosphere which is transported by exhaust gas mass flow into catalytic converter 24 and may react there exothermally. The amount of heat released exothermally in catalytic converter 24 depends, among other things, on the aging state and the temperature of catalytic converter 24.

The first temperature model is preferably based on the hypothesis that catalytic converter 24 has the operability of a borderline catalytic converter. Such a borderline catalytic converter is characterized in that its capability to convert pollutants is just about sufficient or just about no longer sufficient to meet predefined requirements, e.g., statutory requirements. In an exothermally reactive exhaust gas atmosphere, such a borderline catalytic converter therefore releases less heat than a new catalytic converter having an optimum conversion capability which results in a lower first model temperature within the scope of the first temperature model.

Subsequently or also simultaneously, second model temperature T_m_2 is calculated in step 42 on the basis of a second temperature model. The second temperature model is preferably based on the hypothesis that catalytic converter 24 has an optimum pollutant conversion capability and therefore releases a great amount of heat.

In subsequent step 44, a difference D1 is determined from the measured actual temperature T_actual and first model temperature T_m_1. Similarly, a second difference D2 is determined in step 46 from the measured actual temperature T_actual and second model temperature T_m_2. This is followed in step 48 by the formation of a value f (D1) as a function of first difference D1 and value f (D2) as a function of second difference D2. Value f (D1) is preferably the product of D1, the exhaust gas mass flow through catalytic converter 24, and the specific heat capacity of the exhaust gas, so that f (D1) has the dimension of a heat quantity or a heat flow.

Value f (D2) is preferably also the product of D2, the exhaust gas mass flow, and the specific heat capacity of the exhaust gas and has therefore also the dimension of a heat quantity or a heat flow. Value f (D1) then corresponds to the difference between an actual heat flow and a hypothetical heat flow of the type that a borderline catalytic converter would generate downstream from catalytic converter 24. Similarly, value f (D2) corresponds to the difference between a hypothetical, maximum heat flow and the hypothetical heat flow of the borderline catalytic converter downstream from catalytic converter 24. Within a simplified embodiment, the difference may be directly considered instead of the respective heat flows, so that f (D1) equals D1 and f (D2) equals D2.

It is checked in step 50, for example, whether the time variable or counting variable t, initially set to zero, exceeds a predetermined threshold value t_s. In a reducing exhaust gas atmosphere, actively generated for diagnostic purposes, the threshold value is predetermined in such a way, for example, that the reducing exhaust gas atmosphere, generated over a certain period of time (e.g., 10 s), has completely passed through catalytic converter 24 and has its potentially temperature-raising effect deployed there.

In a passive diagnosis during a regeneration of a diesel particulate filter, the threshold value may also be predetermined in such a way, for example, that the reducing exhaust gas atmosphere has completely passed through catalytic converter 24.

Furthermore, the formation of variables f beyond the formation of product may include integration of the formed products over time variable or counting variable t.

As long as t_s is not exceeded, the program branches from step 50 to step 52 in which time variable or counting variable t is increased with a subsequent re-run of steps 38 through 50. The loop of steps 38 through 52 is therefore run through repeatedly until the abort criterion for time variable or counting variable t, checked in step 50, is reached. For checking the conversion capability of catalytic converter 24 it is expedient that the exothermal reactions persist over a certain amount of time, e.g., over a period on the order of magnitude of up to 15 seconds, in order to achieve sufficient temperature amplitudes.

In order to trigger an abort of the diagnosis in a step comparable to step 50, the above-named integrals may alternatively be analyzed with regard to their rate of change.

When time variable or counting variable t exceeds threshold value t_s, step 54 is reached in which value f (D1) is normalized to value f (D2) via quotient formation. In FIG. 2, the quotient formed in that way is labeled as r. If real catalytic converter 24 has the optimum conversion capability of a new catalytic converter, the numerator and the denominator of the quotient formed in step 54 are the same, so that r equals 1. If, however, the conversion capability of real catalytic converter 24 corresponds to the limited conversion capability of a borderline catalytic converter, difference D1 equals zero in the extreme case, so that the numerator of quotient r and thus the value of r equals zero.

Alternatively, to abort the diagnosis after a predetermined period of time, the diagnosis may also be terminated, in particular in the case of a reducing exhaust gas atmosphere generated passively, when this exhaust gas atmosphere disappears, e.g., because a diesel particulate filter regeneration has been terminated. Additionally in the case of this alternative, one may also wait until the reducing exhaust gas atmosphere has passed completely through catalytic converter 24.

In a further alternative, regeneration may also be aborted when stable temperatures have occurred, in the calculated models for example, whose rate of change per time unit is lower than a predetermined threshold value. In this case, no significant improvement in the diagnostic information is to be expected in a longer-lasting diagnosis. This alternative is particularly expedient in an actively generated reducing exhaust gas atmosphere, because the generation of the reducing exhaust gas atmosphere, which increases consumption, may then also be aborted.

The flow chart in FIG. 2 and in particular the check for a special abort condition in step 50 are therefore only to be considered as an example for the fact that the diagnosis is aborted when one or multiple predetermined conditions are met.

If the conversion capability of real catalytic converter 24 is even poorer than that of a borderline catalytic converter, difference D1 and thus ultimately quotient r become negative. The actual conversion capability of real catalytic converter 24 is represented by the values of r. This is utilized in step 56 for evaluating the conversion capability of real catalytic converter 24, i.e., for its diagnosis, by comparing r with a threshold value S. In the described example, S would typically be positive, at least marginally, e.g., equal to 0.2. If it is ascertained in step 56 that r<S, the program branches to step 62 in which the catalytic converter is evaluated as being adequately operational. If, in contrast, r is negative or at least lower than positive value S, the program branches from step 56 to step 58 in which catalytic converter 24 is evaluated as being inadequately operational. This results in step 60, possibly after statistical ascertainment via multiple diagnoses of the catalytic converter, in the activation of a corresponding error display (malfunction indicator light MIL) or in the entry into a corresponding error memory of control unit 33.

One may consider the numerator of quotient r as a measure for the actually exothermally released heat quantity and the denominator as a measure for a reference heat quantity which characterizes an optimum conversion capability of the real coated catalytic converter 24. The quotient is calculated in a time window in which both oxygen and uncombusted fuel arrive in the catalytic converter. As already mentioned, monitoring may take place actively, i.e., in connection with an additional fuel quantity which reaches the catalytic converter uncombusted, injected exclusively for the diagnosis of the catalytic converter, as well as passively, i.e., at points in time at which exothermal exhaust gas atmospheres are generated anyway for the regeneration of a particulate filter, for example. The normalization allows an effective diagnosis of catalytic converter 24 in a wide range of the operating map with great reliability of the monitoring result, since the released heat is integrated over a time window and the result at an individual point in time not being a determining factor. A further advantage is the fact that this type of diagnosis of the catalytic converter requires only small additional amounts of fuel.

The use of the integrated heat flows downstream from catalytic converter 24 allows, in particular in the above-mentioned active approach, a diagnosis with additional fuel being metered very sparingly. Temperature amplitudes in the range of 50 K to 70 K are sufficient for reliable diagnostic results which, in direct analysis of the measured and modeled temperatures, would not allow reliable information due to tolerances and inaccuracies. A direct analysis is understood to be an analysis of instantaneous values without integration over the time window in which an exothermally reactive exhaust gas atmosphere exists in the catalytic converter. Catalytic converter 24 may be a conventional 3-way catalytic converter, a catalytically coated particulate filter, or also an NOx accumulator-type catalytic converter.

For forming the first model temperature, instead of using the hypothesis of the borderline catalytic converter, a hypothesis may also be used for a catalytic converter which has a no longer sufficient conversion capability. In this case, only threshold value S, with which quotient r is compared in step 56, must be properly adapted. The exhaust gas mass flow, used in the embodiment according to FIG. 2, may be formed from measured values for an air quantity or air mass flow flowing into the combustion chambers of internal combustion engine 10 and a metered fuel quantity or fuel mass.

Temperatures of catalytic converter 24 are modeled on the basis of different hypotheses about its conversion capability, for example, by using a temperature value measurable downstream from the catalytic converter as a starting value or initial base value prior to generating an exothermally reactive exhaust gas atmosphere in catalytic converter 24 and by adding to this base value a temperature offset which results from a balance, i.e., a sum of temperature-increasing and temperature-reducing effects. Heat released through exothermal reactions has primarily a temperature-increasing effect. The effect of the exhaust gas heat flow is also taken into account, whose sign depends on whether the exhaust gas temperature upstream from catalytic converter 24 is higher or lower than the catalytic converter's temperature. The exhaust gas temperature may be measured or modeled upstream from the catalytic converter. Furthermore, the heat loss due to radiation and cooling by the air stream resulting from the vehicle's movement is also advantageously taken into account, the heat loss being a function of the outside temperature and the vehicle's velocity. These variables may also be measured or determined from other measured variables, e.g., from the intake air temperature. The vehicle's velocity is a variable detected in the motor vehicle anyway and is therefore available.

The value of the contribution of exothermal reactions results, for example, from the division of a heat quantity $Q\_K$ released in catalytic converter 24 by its constant mass $m\_K$ and its heat capacity $c\_K$, this quotient being additionally multiplied by a hypothetically assumed efficiency factor $\eta\_K$ which represents the conversion capability of catalytic converter 24. Efficiency factor $\eta\_K$ is, for example, close to 1 for an optimum catalytic converter 24 and in any case clearly lower than 1 for a borderline catalytic converter.

Heat flow $Q\_K$ may be evaluated from measured values for air mass flow mL flowing into the combustion chambers of the internal combustion engine, for the exhaust gas' lambda value measured by sensor 22, and for the quantity of the metered fuel.

The product of difference $\lambda-1$ and the entire air mass flow mL is a measure for the air excess, for example. Fuel quantity mK metered into this air excess may be multiplied by a factor 14.7 which then results in an air equivalent of the additionally injected fuel mass mK. The minimum selection between the values of the air excess and the mentioned air equivalent ts of the additionally injected fuel quantity results in the amount of the stoichiometrically reactive mixture in catalytic converter 24 which may be converted into a heat quantity via access to a characteristic curve.

What is claimed is:

1. A computer program embodied on a computer-readable medium, the computer program containing instructions which, when executed by a processor, perform the following method for diagnosing a catalytic converter:
   repeatedly measuring an actual temperature downstream from a catalytic converter volume;
   repeatedly calculating a first model temperature on the basis of a first temperature model;
   calculating a second model temperature on the basis of a second temperature model;
   forming a first difference which is a function of the actual temperature and the first model temperature;
   forming a second difference which is a function of the second model temperature and the first model temperature, and
   evaluating a conversion capability of the catalytic converter volume on the basis of a value which is a function of the first difference, the value being normalized to a value which is a function of the second difference.

2. A memory medium of a controlling/regulating system of an internal combustion engine, the memory medium storing a computer program, the computer program containing instructions which, when executed by a processor, perform the following method for diagnosing a catalytic converter:
   repeatedly measuring an actual temperature downstream from a catalytic converter volume;
   repeatedly calculating a first model temperature on the basis of a first temperature model;
   calculating a second model temperature on the basis of a second temperature model;
   forming a first difference which is a function of the actual temperature and the first model temperature;
   forming a second difference which is a function of the second model temperature and the first model temperature; and
   evaluating a conversion capability of the catalytic converter volume on the basis of a value which is a function of the first difference, the value being normalized to a value which is a function of the second difference.

3. A controlling/regulating system of an internal combustion engine for diagnosing a catalytic converter, the system comprising:
   a measuring arrangement for repeatedly measuring an actual temperature downstream from a catalytic converter volume;
   a calculating arrangement for repeatedly calculating a first model temperature on the basis of a first temperature model, and for calculating a second model temperature on the basis of a second temperature model;
   a differencing arrangement for providing a first difference which is a function of the actual temperature and the first model temperature and for providing a second difference which is a function of the second model temperature and the first model temperature; and
   an evaluating arrangement for evaluating a conversion capability of the catalytic converter volume on the basis of a value which is a function of the first difference, the value being normalized to a value which is a function of the second difference.

4. A method for diagnosing a catalytic converter comprising:
   repeatedly measuring an actual temperature downstream from a catalytic converter volume;
   repeatedly calculating a first model temperature on the basis of a first temperature model;
   calculating a second model temperature on the basis of a second temperature model;
   forming a first difference which is a function of the actual temperature and the first model temperature;
   forming a second difference which is a function of the second model temperature and the first model temperature; and
   evaluating a conversion capability of the catalytic converter volume on the basis of a value which is a function of the first difference, the value being normalized to a value which is a function of the second difference.

5. The method according to claim 4, wherein the first temperature model forms the first model temperature by emulating a first heat quantity released by a first model catalytic converter and the second temperature model determines the second model temperature on the basis of a second heat quantity released by a second model catalytic converter, the second model catalytic converter representing a real catalytic converter having a full conversion capability.

6. The method according to claim 5, wherein the first model catalytic converter represents a real catalytic converter which represents a transition between a real catalytic converter having a limited but still adequate conversion capability.

7. The method according to claim 5, wherein the first model catalytic converter represents a real catalytic converter having a no longer adequate conversion capability.

8. The method according to claim 4, wherein the first model temperature and the second model temperature are formed taking into account an exhaust gas mass flow.

9. The method according to claim 8, wherein the exhaust gas mass flow is formed from a measured value of an air quantity flowing into combustion chambers of an internal combustion engine and a metered fuel quantity.

10. The method according to claim 9, further comprising:
    multiplying values of the actual temperature, the first model temperature, and the second model temperature by values of the exhaust gas mass flow; and
    integrating resulting products over a time interval during which a reactive exhaust gas atmosphere prevails in the catalytic converter volume.

* * * * *